N. S. AMSTUTZ.
MICROSCOPY.
APPLICATION FILED AUG. 9, 1909.
1,145,959.
Patented July 13, 1915.
3 SHEETS—SHEET 3.
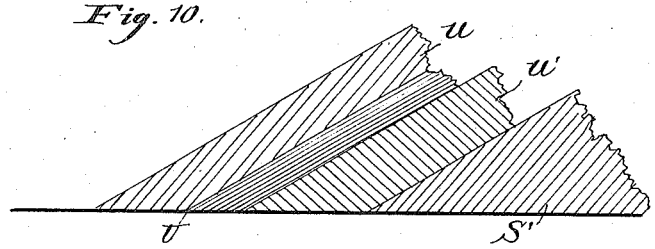
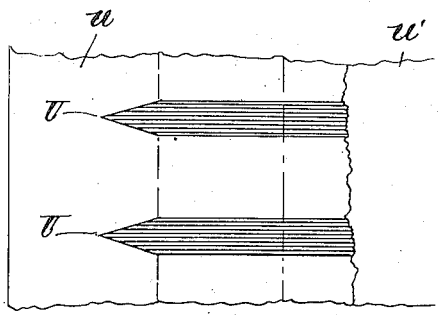
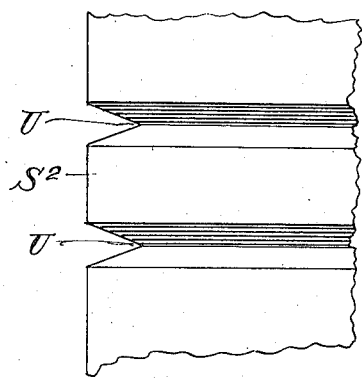

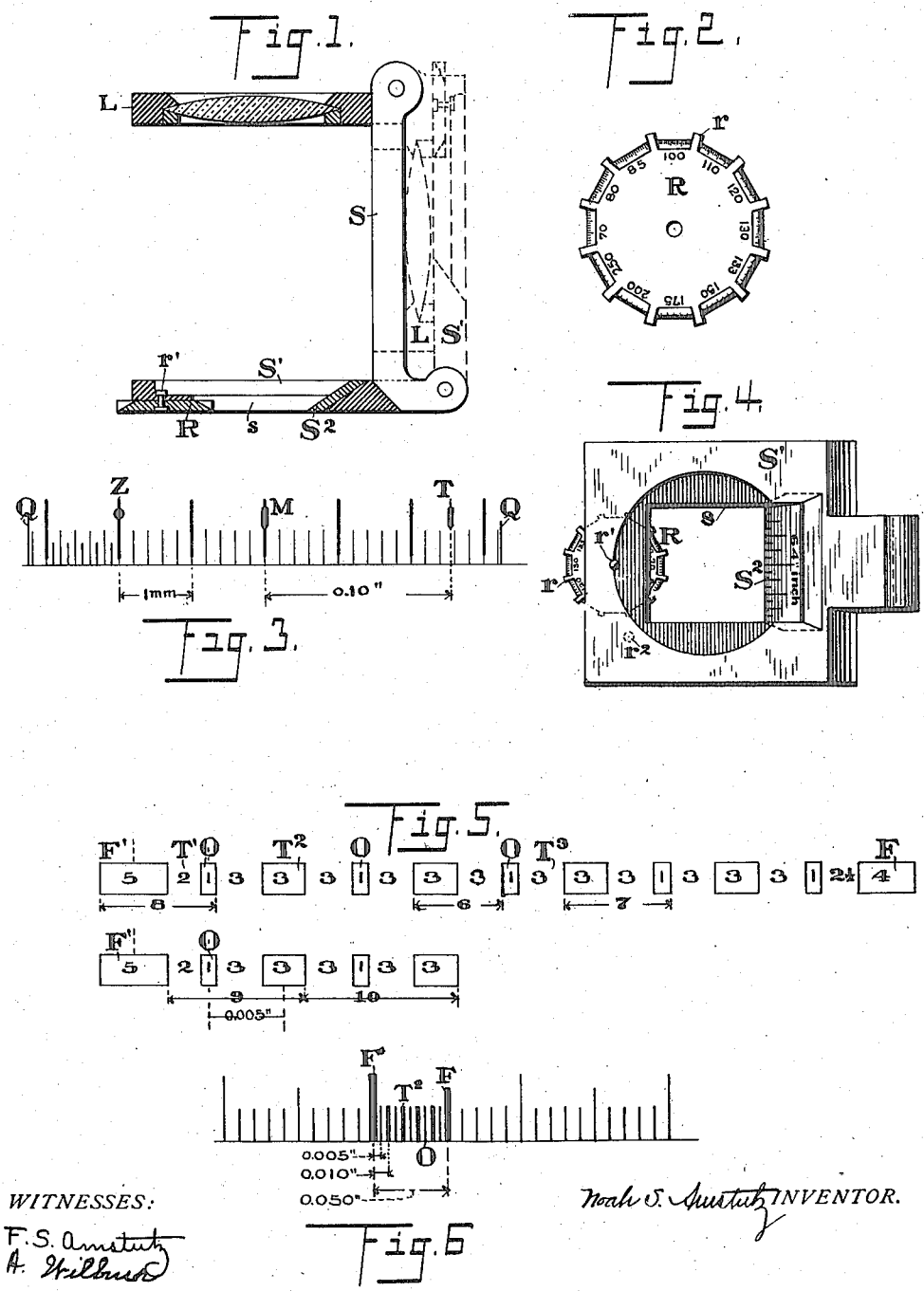

UNITED STATES PATENT OFFICE.

NOAH S. AMSTUTZ, OF VALPARAISO, INDIANA.

MICROSCOPY.

1,145,959.            Specification of Letters Patent.     Patented July 13, 1915.

Application filed August 9, 1909. Serial No. 512,068.

*To all whom it may concern:*

Be it known that I, NOAH S. AMSTUTZ, citizen of the United States, residing at Valparaiso, in the county of Porter and State of Indiana, have invented certain new and useful Improvements in Microscopy, of which the following is a specification.

My invention relates to improvements in microscopy and it specially appertains to the formation of suitable scales on the object plane of the microscope so that as the object is magnified the scale will be enlarged to the same extent simultaneously without the formation of parallax errors of any kind whatever. Since the greater use for this kind of a scale will undoubtedly be found in connection with single lens magnifiers, it is desirable that the scale be fairly coarse so as to come within the resolving power of a single lens. In order to at the same time make it possible to read small dimensions with considerable exactitude on such coarse scales I may form certain group division lines definitely wider than the lines which define the smallest divisions but of a definite width relation to each other, so that from the edge of a wide line to the nearest edge of an adjacent line will be a certain multiple of a fundamental unit. An increase of this unit being designated when the farther edge of the adjacent line is used and a nearer approach to its dimension when the width of a single line is taken, etc.

In the accompanying drawing I illustrate such an instance of adaptation that will disclose the various features of the invention.

Figure 7:
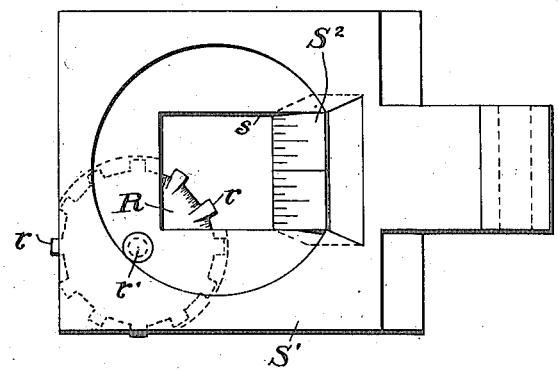
Figure 8:
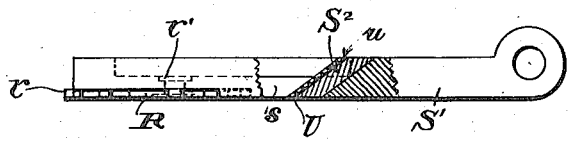

Figure 1. is a side elevation of a folding form of magnifier in section, showing two forms of scales and the folded relation of the several parts, in dotted lines. Fig. 2. is a plan view of a multiple comparison scale disk. Fig. 3 is a diagrammatic view of a lineal scale showing how several units may be combined on one scale. Fig. 4. is a plan view of the assembled relation of the base S' of Fig. 1. This figure shows an arbitrary coarseness of the scale, marked "64th inch" so that the proper relation of the divisions of the scale to the stage opening is retained for purposes of the drawing only. Fig. 5. is a diagrammatic view of a scale having differential line widths, showing how multiples of a unit may be found through different combinations of divisions, line widths and line edges. The second row is simply a duplication of the first part of the first row in order to avoid confusion in placing the dimensions, shown in two places, at one place only. Fig. 6. is a reduced diagram of Fig. 5. Fig. 7 is a plan view of the focal plane stage showing a horizontally rotatable measuring scale pivoted near the corner of the said stage. Fig. 8 is an enlarged cross section showing the inclined scale lines and the termination of the V shaped grooves thereof. Fig. 9 is an enlarged plan view, showing how unfilled V shaped lines terminate with V formed characteristics on the focal plane. Fig. 10 is an enlarged section of "sealed in" lines, which may be V or other shaped in cross section. Fig. 11 is a plan view of Fig. 10 showing how filled V shaped lines terminate with V formed characteristics on the focal plane when "sealed in" by a transparent material.

I am aware that ruled plates have been used in blood-count investigations to show the number of corpuscles in a given area, but in this use the scale is beneath the object being examined while in my device the scale is placed on top of the object. In the ruled plate type of scale it is only possible to compare microscopic objects that lie on the focal plane and project below it.

In order that the ruling may be kept relatively coarse I form the scales with differential line widths whenever desired. I may combine more than one scale on the same scale face or I may make several scales on different faces and arrange them so that they may be successively brought into position. Fundamentally it is immaterial whether my scales are used with a simple or a compound microscope. If used with a compound instrument I may combine with the device a change-in-focus scale of the usual order to show the variations from a normal focal plane and thus admit of the instrument serving the purpose of a depth gage.

Should it be desirable to so form scales as to protect them from scratches, etc., I may make them on thin transparent sheets and cement them, face down, onto a surface having a contrasting color so as to make them more legible. For instance, black lines on a white ground—on a transparent sheet cemented to a white base.

These features are clearly shown in Figs.

10 and 11. When lines are to be protected and V shaped terminations, U, thereof are desired it will be found necessary to form the V grooves in the transparent sheet, $u$, fill them with an opaque material and then cement the same face down onto the white base, $u'$.

An important feature of the device is the entire elimination of parallax errors by making the scales terminate on the focal plane in a knife edge.

Another important feature is to be found in placing the scale to one side of the optical axis so as to leave the entire center unobstructed through which projecting parts of an object may project while details that occur on a lower plane are being examined. If the scale was formed on the underside of a transparent material that covered the opening of the focal plane stage the possibility of parallax errors arising would be eliminated but no object having projections above the plane that was to be examined could be inspected at all for the reasons just previously stated.

As the device is intended for continuous use in the field, the shop, the home as well as the laboratory it is necessary to have it made so as to stand a fair amount of rough usage without losing its availability for delicate measurements.

The folding stage, $S'$, shown in Figs. 1 and 4 is pivoted to the standard, S, which at its upper end supports the lens plate, L. This is also pivoted to the standard, S, in a well known manner. The stage, $S'$, has an opening, $s$, formed therein and at one side thereof the scale, $S^2$, is placed and at one corner of the plate, $S'$, the revolving comparison scale disk, R, may be secured, as shown in Fig. 7 or it may be placed as shown in Fig. 4, central of one of the sides of the opening, $s$, but it will be seen that the location at one of the corners will permit of a larger diameter of the disk with a consequent increase in the size or length of the scales that may be formed on the different edges of the disk.

From the above description it will be seen that there are a plurality of scales within the field of view simultaneously. In Fig. 7 the relation of parts when the scale is pivoted near one corner of the plate are more clearly shown.

On the disk, R, a series of arbitrary divisions are formed having a designating number attached thereto. In the instance shown they represent various lines per inch, useful in photo-engraving comparisons. Between each adjacent pair of scales a small tooth or projection, $r$, is made so as to facilitate the turning of the disk on its pivot pin, $r'$. The scales project into the field of vision on the focal plane, within one edge of the opening, $s$.

In Fig. 3, is shown a form of scale in which the unit of division to the right of the zero line, Z, is the one-fifth part of a millimeter, (0.2 mm.) each fifth line being wider so as to mark full millimeters. The usual differentiation of full millimeter lines by making them longer only, than the others may be followed, if desired, to the exclusion of the widened lines just referred to. To the left of the zero line, Z, the divisions are one-tenth millimeter. These two sets of divisions are approximately 0.008 and 0.004 inch making it an easy matter to estimate to one-half and one-quarter divisions, representing fractional parts of the 0.008 and 0.004 of an inch referred to. The errors due to this approximation are negligible within the resolving power of the single lens used and in fact they are of such small magnitude that they may be safely ignored within the small lineal dimension of the one-fourth inch opening, $s$. The 0.008 inch divisions are only 0.000126 inch too large and the 0.004 inch only 0.000063 inch in excess of the exact inch equivalent, the exact equivalent being 0.007874 and 0.003937 inch respectively.

The lines, Q and Q define the limits of a quarter-inch space and between the millimeter line, M, and the special line, T, is the exact equivalent of one-tenth of an inch. This last division is desirable to show how many threads or lines per inch are found in screw threads or the lines per inch in various engravings, etc., that do not match the divisions or their multiples found on the disk, R. In order to use this one-tenth inch division it is only necessary to count the number of threads or lines between these points and multiply by ten. On the other hand if other threads or lines are to be measured than those that match with the main divisions found on the disk, R, they may be identified by using a certain recurrence of subdivisions, as for instance, in the 65 division scale every fifth division represents thirteen per inch; in the 80 scale, every second line, 40, every fourth line, 20 and every fifth line, 16. Other sets of standards may be selected to give a nearer approach to an unbroken sequence of divisions, ranging from the lowest to the highest values, if desired.

The differential line width scale is illustrated in Figs. 5 and 6, wherein the unit shown is 0.001 inch and the ruling represented is assumed to be 200 lines per inch so as to show half-hundredth of an inch. In practice this feature would not extend over more than one of the larger divisions of a scale. At these rulings the distance between centers of lines will be 0.005 inch. The variable width lines are produced by causing a V shaped cutter of definite angle to cut deeper for some lines than for others, but on a definite interrelated basis. If the included angle of such a cutter was 90 degrees then the width of the line would always be double the depth cut. If the angle is 53 degrees the depth of groove will always be the same as the width, thus it will be seen that the production of these differential scales depends simply on causing a fixed angled cutter to penetrate into the surface to a definite depth.

Reverting to Fig. 5, lines, O, are 0.001 inch wide; spaces, T', are 0.002 inch; lines T² and spaces, T³, are 0.003 inch; lines, F, are 0.004 inch and lines, F' are 0.005 inch wide. To secure a definite point for comparison of the other multiples of the unit it is only necessary to follow the next steps.

To make 0.006 inch, a line, T² and space, T³ are used together. For 0.007 inch, line, T², space, T³, and line, O, are taken. To make 0.008 inch, a line, O, space, T', and line, F', are required. For 0.009 inch, spaces, T', T³ and lines, O and, T². For 0.010 inch, two of the smallest divisions of Fig. 6, or two, T³ spaces and lines O and, T², of Fig. 5. It is understood that this feature may be applied to any other basis of measurement wherein the divisions and the differential widths of the lines will lend themselves to the carrying out of a consecutive sequence of multiples of a fundamental unit.

The features shown in Figs. 5 and 6 may be incorporated with that shown in Fig. 3, extending over the space, M—T, if desired, or another of the sides of the opening, s, may be used for this purpose. Should another scale, such as the printer's point system be desired it can be added to the third side of the opening, s. The unit of such a system being known as 0.01384 inch, approximately 1/72 inch—exactly 1/72.25 inch.

In this connection it is important to be able to use more than one unit of measurement within the field of the magnifying lens simultaneously. This may comprise the scales R with S² or the extreme limits of a quarter of an inch, Q—Q which in the instance shown coincides with one of the sides of the opening S. Should this opening be larger than such a unit, a quarter inch notch would serve to define the unit or another representing a one-tenth inch the value of M—T or any other lineal basis in connection with a scale S² would make them visible at the same time for direct comparison under the lens thus making possible the quick valuation of dimensional equivalents within the range of the device without recourse to tables or other expedients.

It is desirable to call attention to the feature of the differential line width scales comprised in the V shaped form of the grooves taken in connection with the knife-edge structure of the scale. From the fact that the scale face is on an incline to the focal plane and the knife-edge coincides with the focal plane it is obvious that the V shaped grooves will be apparent along the knife-edge and the apex of the V will be in the center of a line, from which great exactitude of measurements can be attained in using the sides of the V as another basis of comparison. This characteristic will be found valuable whether differential line widths are used or not, as by this style of groove wider lines may be formed and yet the apex of the V will always give the most exact relation for delicate measurements. When V grooves are formed so as to end onto an edge which is perpendicular to the line none of the V shaped terminations will be produced. The plane on which they terminate must form an acute angle to the lines themselves.

From the description it will be apparent how much the several features enumerated are dependent on each other and how well they fill an unsupplied want through their simplicity and practical form of construction.

What I claim is—

1. In optical micrometers, the combination of an enlarging device, a suitable support therefor, a focal plane stage and a rotatable scale disk comprising a series of scales around the outer edge thereof.

2. In optical micrometers, the combination of an enlarging device, a suitable support therefor and a rotating scale disk held on said support at the focal plane thereof, said disk having a series of projections and scales formed between them around the rim thereof.

3. In optical micrometers, the combination of a supporting frame, a pivoted lens support secured thereon, a pivoted focal plane stage held thereby at a point opposite to the lens support and an opening in the stage, with a plurality of differential scales visible therein, said scales terminating on the same focal plane, so as to be in view simultaneously whereby direct comparisons can be made between the various units comprising said scales.

4. A lens, a suitable base, a support for both, a transparent surface secured to the base, pointed measuring lines formed between the same and said base, said points and the object under examination being simultaneously visible through the said lens.

5. In optical micrometers, the combination of a suitable base formed of a distinctive color adapted to reflect a large number of incident light rays, a transparent material secured thereon, and measuring lines formed therebetween, said lines starting above and terminating in points on the focal plane of the micrometer.

6. In optical micrometers, a folding frame, a lens carried by one member, a composite measuring scale having pointed lines carried by another member, and a connecting member adapted to fix the focal distance of said lens, the measuring scale being sealed in to protect the same and being inclined at an angle to the focal plane.

7. In optical micrometers, the combination of a supporting frame, a pivoted lens support, a pivoted scale support, means adapted to limit their movement in one direction when the scale is at the focal plane of said lens, and a series of differential scales on said support, with scale planes formed at an angle to the focal plane, whereby only one end of the scale lines reach the same plane as the object being examined.

8. In optical micrometers, the combination of a lens, a support therefor, a focal plane stage, an opening formed therein, and a series of scales formed on the borders of said opening, outside of the axial center of the lens system but simultaneously visible throughout their lengths within the field of said lens.

9. In optical micrometers, an enlarging device, a suitable holder therefor, a focal plane stage, a rotatable scale mounted on said stage, a plurality of measuring lines formed adjacent the edges thereof, and a projection formed between pairs of said scale.

10. In optical micrometers, an enlarging device, a suitable holder therefor, a focal plane stage, a series of differential scales rotatably supported on said stage so as to present two or more of said scales within the field of view simultaneously 11. In optical micrometers, an enlarging device, a suitable holder therefor, a focal plane stage, a plurality of measuring scales movably supported on said stage so as to retain all of said scales on the same plane.

12. In optical micrometers, an enlarging device, a suitable support therefor, a focal plane stage, means for holding the stage at the proper distance from the enlarging device, a plurality of beveled scales secured thereon, said scales presenting their measuring edges on the focal plane simultaneously.

13. In optical micrometers, an enlarging device, a suitable holder therefor, a focal plane stage, a series of measuring lines of different widths supported thereon at an inclination to and terminating on the same focal plane.

14. An enlarging device, a suitable holder therefor, a focal plane stage, a scale member secured thereto having V shaped measuring lines formed thereon, said member being held at such an angle to the focal plane as to cause the terminating ends of said lines to be pointed.

15. A suitable support, a lens carried thereby, a focal plane stage attached thereto, and a plurality of dimensional indicators representing different measuring units carried by the stage and visible within the field of view of the lens simultaneously.

16. A suitable support, a lens carried thereby, a focal plane stage attached thereto, a plurality of comparison edges on said stage, and measurement indicators representing extremes and sub multiples of linear units formed on the edges whereby a comparison of the units is facilitated.

17. A measuring scale comprising lines representative of various lineal values said lines being formed of varying widths defining corresponding variations in the spaces between them, both conforming to a given unit whereby different groups of lines and spaces will aggregate different multiples of said unit.

18. A suitable support, a lens held thereby, a focal plane stage secured thereto, and a series of measuring lines terminating in points on the focal plane of the said lens.

19. A suitable support, a lens held thereby, a focal stage secured thereto, a series of measuring points on the focal plane, and suitable indications of lineal equivalents adjacent the said points adapted to differentiate the fundamental units.

20. A suitable support, a lens held thereby, a focal plane stage secured thereto, minor and major measuring points located on the focal plane, the major points representing different basic units and the minor points divisions common to the major divisions.

In testimony whereof I affix my signature in presence of two witnesses.

NOAH S. AMSTUTZ.

Witnesses:
F. S. AMSTUTZ,
A. WILBUR.